United States Patent

Rafanello et al.

(10) Patent No.: US 6,523,047 B1
(45) Date of Patent: Feb. 18, 2003

(54) SYSTEM AND METHOD FOR VOLUME EXPANSION IN THE PRESENCE OF MULTIPLE PLUG-IN FEATURES

(75) Inventors: Benedict Michael Rafanello, Round Rock, TX (US); Mark A. Peloquin, Austin, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 09/640,511

(22) Filed: Aug. 17, 2000

(51) Int. Cl.$^7$ .............................................. G06F 12/00
(52) U.S. Cl. ....................... 707/200; 711/165
(58) Field of Search ................. 711/111, 112, 113, 711/114, 165; 707/200, 205, 104.1, 10, 3

(56) References Cited

U.S. PATENT DOCUMENTS

| | | | | |
|---|---|---|---|---|
| 4,310,883 A | * | 1/1982 | Clifton et al. | 707/205 |
| 5,129,088 A | | 7/1992 | Auslander et al. | 395/700 |
| 5,247,660 A | | 9/1993 | Ashcraft et al. | 395/600 |
| 5,546,557 A | * | 8/1996 | Allen et al. | 711/111 |
| 5,983,316 A | | 11/1999 | Norwood | 711/112 |
| 5,999,930 A | | 12/1999 | Wolff | 707/8 |
| 6,035,306 A | * | 3/2000 | Lowenthal et al. | 707/10 |
| 6,219,693 B1 | * | 4/2001 | Napolitano et al. | 710/33 |
| 6,397,292 B1 | * | 5/2002 | Venkatesh et al. | 711/113 |
| 6,449,652 B1 | * | 9/2002 | Blumenau et al. | 711/164 |

OTHER PUBLICATIONS

Keele R. V. Mass Storage Systems, 1988 Ninth IEEE Symposium on Storage Systems: Perspectives. Digest of Papaers, pp. 68–71.*

* cited by examiner

Primary Examiner—Jack Choules
(74) Attorney, Agent, or Firm—Robert H. Frantz; David A. Mims, Jr.

(57) ABSTRACT

An enhancement to existing logical volume managers which provides the functionality to expand logical volumes employing multiple levels of aggregation. It includes functionality to determine if a logical volume employing multiple levels of aggregation can be expanded. If it can be expanded, the aggregator or feature which will perform the expansion is determined. Once this has been done, the features and aggregators that need to be applied to the partitions being added to the volume are determined. These features and aggregators are then applied to the partitions being added to the volume, with user input as required. Finally, the aggregator which will perform the actual expansion is called, the volume is expanded, and all of the remaining features and aggregators on the volume are given the opportunity to update their respective data as appropriate to accommodate the new size of the volume

11 Claims, 6 Drawing Sheets

*Prior Art*

SYSTEM AND METHOD FOR VOLUME EXPANSION IN THE PRESENCE OF MULTIPLE PLUG-IN FEATURES

CROSS-REFERENCE TO RELATED APPLICATIONS (CLAIMING BENEFIT UNDER 35 U.S.C. 120)

This application is related to U.S. applications Ser. No. 09/561,184 filed on Apr. 27, 2000 and entitled "SYSTEM AND METHOD FOR A MULTI-LAYER LOGICAL VOLUME MANAGEMENT SYSTEM," Ser. No. 09/616,131 filed on Jul. 13, 2000 and entitled "CONTROL OR MULTIPLE LAYER AGGREGATION LOGICAL VOLUME MANAGEMENT DATA BOOT RECORD," and Ser. No. 09/616,146 filed on Jul. 13, 2000 all by Benedict Michael Rafanello, et al. All three related applications are commonly assigned.

INCORPORATION BY REFERENCE

The related applications Ser. Nos. 09/561,184, 09/616,131 and 09/616,146 as listed above, are incorporated herein by reference in their entirety, including drawings for all purposes and hereby are made a part of this application.

FEDERALLY SPONSORED RESEARCH AND DEVELOPMENT STATEMENT

This invention was not developed in conjunction with any Federally sponsored contract.

BACKGROUND OF THE INVENTION

1. Field of the Invention

This invention relates to the arts of computer disk media, formatting of computer disks, organization of computer readable media by operating systems and device drivers, and the management of logical volumes of computer disks. In particular, this invention relates to improvements in the method for the expansion of logical volumes of disc media in the presence of plugin features in the logical volume structure.

2. Description of the Related Art

Persistent and mass data storage devices for computer systems, especially those employed in personal computers, are well known within the art. Many are disk-based, such as floppy disks, removable hard disk drives ("HDD"), and compact-disk read only memories ("CD-ROM"). FIG. 1 shows a typical personal computer system (1) architecture, wherein a CPU (2) interfaces to a variety of I/O devices such as a keyboard (3), monitor or display (5) and a mouse (4). The CPU (2) also may interface to a number of storage peripherals including CD-ROM drives (7), hard disk drives (6), and floppy drives (5). Typically, floppy disk drives interface to the CPU via Integrated Drive Electronics ("IDE") (8), but this interface may alternately be one of several other standard interfaces or a proprietary interface. The hard disk drives (6) and CD-ROM drives (7) may interface to the CPU (2) via an IDE or Small Computer System Interface ("SCSI"), as shown (9).

FIG. 2 shows a generalization of the hardware, firmware and software organization of a personal computer system (20). The hardware group (21) includes the persistent storage devices discussed supra, as well as other system hardware components such as a real-time clock, keyboard controller, display adapter, etc. A basic input/output system ("BIOS") (22) provides the direct firmware control of these system components typically. An operating system (24) such as the IBM OS/2 operating system provides high level management of the system resources, including the multitasking or multi-threaded scheduling and prioritization of the system application programs (25). Drivers (23) provide specific high-level interface and control functions for specific hardware, such as a manufacturer and model-specific LAN interface card driver or CD-Rewritable ("CD-RW") driver. This generalized view of the system also applies to systems on alternate, non-IBM-compatible platforms, such as workstations, which employ a variety of operating systems such as Microsoft Windows, UNIX or LINUX. This general organization of computer system resources and software functionality is well understood in the art.

Turning to FIG. 3, disk-based mass storage devices such as hard disk drives, floppy disks and CD-ROMS are based physically on a rotating storage platter (30). This platter may be made of flexible mylar, such as floppy disks, or more rigid platters made of aluminum, glass or plastic, such as hard disk drives and CD-ROMS. For magnetic media, one or both sides of the platter are coated with a magnetic layer capable of recording magnetic pulses from a read/write head. For optical media, data recording is made using changes in reflectivity of a band of light, which is then read by a laser-based head. Writable and Re-writable CD-ROM drives combine the technologies of magnetic disks and optical disks. In general, though, the organization of data on the disk is similar. The disk surfaces are divided into multiple concentric rings, or tracks (31). Some disk drives, such as hard disk drives, consist of multiple platters, in which case corresponding tracks on each platter are grouped into cylinders. Each track is divided into multiple sectors (32) in which data can be stored.

Turning to FIG. 4, a computer disk drive (41) is represented as an ordered collection of sectors numbered 0 through "n". The very first sector on the hard drive, sector zero, contains the Master Boot Record ("MBR"). The MBR contains partition definitions for the rest of the disk. TABLE 1 shows a sample partial MBR.

TABLE 1

Partition Table for 6 GB Drive

| Partition | Start (cyl, side, sector) | End (cyl, side, sector) | Length (sectors) |
|---|---|---|---|
| first | 0, 1, 1 | 391, 254, 63 | 6297417 |
| second | 392, 0, 1 | 783, 254, 63 | 6297480 |

For the disk partitioning shown in TABLE 1, the MBR is located in the first sector on side 0 at cylinder 0 sector 1. The MBR requires only one sector, but the entire track of 63 sectors is "blocked" for the use of the MBR, 62 sectors of side 0 cylinder 0 are left unused.

The partition table has entries in it defining two types of partitions: primary and extended. Conventional disk formatting schemes allow only one extended partition (411) to be defined. P1 (43) and P2 (44) are primary partitions. The order and locations of the primary and extended partitions may vary, but invariably there are entries in the partition table of the MBR which defines them.

The extended partition (411) is defined in the partition table in the MBR as a single partition using a single entry in the MBR partition table. Basically, this entry in the MBR just indicates to the computer operating system that inside of this extended partition can be found other partitions and partition definitions. The operating system typically assigns logical drive letters and/or logical volumes to these partitions, or groups of partitions.

In order to determine the size and location of the partitions within the extended partition, the operating system accesses the first sector of the extended partition which typically contains another boot record, known as an Extended Boot Record ("EBR"). The format of the EBR is similar to that of the MBR, and is also well known in the art.

FIG. 4 shows a first EBR (45), a second EBR (47), and a third EBR (49) within the extended partition (411). In practice, there may be fewer or more EBR's within an extended partition.

Each EBR contains a partition table similar to a MBR partition table. Conventionally for computer drives commonly used in personal computers and workstations, only two entries may be in use in each EBR. One entry will define a logical partition, and the second entry acts as a link, or pointer, to the next EBR. FIG. 4 shows a pointer (412) from the second entry of the first EBR (45) to the beginning of the second EBR (47), and a similar pointer (413) from the second entry of the second EBR (47) to the beginning of the third EBR (49). The last EBR in the extended partition does not contain a pointer to a subsequent EBR, which indicates to the operating system that it is the last EBR in the extended partition. In this manner, the operating system can find and locate the definitions for an unlimited number of partitions or logical drives within the extended partition on a deterministic basis.

In each partition table entry, whether it be an EBR or an MBR, there are certain fields which indicate to the operating system the format, or file system, employed on the disk. For example, for DOS ("disk operating system") systems, the field may indicate that the file system is File Allocation Table ("FAT") formatted. Or, for systems which are running IBM's OS/2 operating system, the entry may indicate that the file system is High Performance File System ("HPFS") formatted. There are a number of well-known file system formats in the industry, usually associated with the common operating systems for computers such as Microsoft's Windows, IBM's OS/2 and AIX, variants of UNIX, and LINUX. Using this field, the operating system may determine how to find and access data files stored within the partitions of the primary and extended partitions on the computer disk. The file system format indicator is sometimes called the "system indicator".

IBM's OS/2 operating system includes a function referred to as the Logical Volume Manager, or "LVM". For systems without an LVM, each of the partitions that is usable by the operating system is assigned a drive letter, such as "C:" or "F:", producing a correlating drive letter for each partition on a disk in the computer system. The process which assigns these letters is commonly known. For systems with an LVM, a drive letter may be mapped instead to a logical volume which may contain one or more partitions. The process by which partitions are combined into a single entity is known generically as "aggregation." Given the highly modular design of the OS/2 LVM, the functionality which performs aggregation is contained completely within a single module of the LVM program. LVM calls any module which performs aggregation an "aggregator".

There are various forms of aggregation, such as drive linking, mirroring, and software Redundant Array of Independent Disks ("RAID"). The OS/2 LVM allows a single level of aggregation through the use of drive linking.

The OS/2 LVM also provides "features" for use on logical volumes. Currently, the only feature supported is Bad Block Relocation (BBR), but this may change in the future. In general, features are intended to filter or transform data as it comes and goes to the volume. Examples of potential features would be encryption, data compression, and logical volume monitoring and statistics.

Internally, the OS/2 LVM uses a layered model. Each feature offered by the LVM for use on a volume is a layer in the LVM. The input to a layer has the same form and structure as the output from a layer. The layers being used on a volume form a stack, and I/O requests are processed from the top most layer down the stack to the bottom most layer. Currently, the bottom most layer is a special layer called the pass through layer. The top most layer is always the aggregator, which, in the current implementation, is always the drive linking layer. All of the layers in the middle of the stack represent non-aggregation features, such as Bad Block Relocation.

FIG. 5 illustrates the relationship of the layered model of the LVM and the aggregation of physical partitions into a logical volume (90). On the left, the "feature stack" is shown, having a "pass through" layer (97) at the bottom which interfaces directly to the disk devices or device drivers. Above the "pass through" layer (97) may be a feature (96), such as Bad Block Relocation ("BBR"). Above the feature may be a layer of aggregation, such as drive linking (95). From the view of the feature stack model, an I/O request (98) is received at the top of the stack and propagated downwards to the pass through layer. Comparing that to a tree model of a logical volume (90), the aggregator A1 (91) corresponds to the aggregation layer (95), the feature layer (96) corresponds to the three interfaces between the aggregator A1 (91) and it's partition definitions P1, P2, and P3 (92, 93, and 94 respectively), and the pass through layer (97) corresponds to the interfaces between the partition definitions and the actual devices or device drivers. These types of LVM structures, feature stack models, and tree models are well understood in the art, and the models can be equally well applied to logical volume management systems in other operating systems such as Hewlett Packard's HP-UX and IBM's AIX.

Partitions which are part of a logical volume have a special filesystem format indicator. This indicator does not correspond to any existing filesystem, and it serves to identify the partitions as belonging to a logical volume. The actual filesystem format indicator for a logical volume is stored elsewhere. Furthermore, partitions belonging to a volume have an LVM Data Area at the end of each partition in the volume. The data stored in the LVM Data Area allows the LVM to re-create the volume every time the system is booted. Thus, the LVM allows groupings of partitions to appear to the operating system as a single entity with a single drive letter assignment.

The LVM, as currently described, is a static design, with a fixed feature set and a single aggregator. Every volume which employed the aggregator could be expanded up to the limit of what the aggregator supported. Every volume which employed an aggregator also employed the same features, in the same order, on every partition in the volume. Thus, it is easy to perform an expansion as the LVM already knows what features must be applied to the partitions being added to the volume, and the LVM already knows the aggregator which will be responsible for actually adding the new partitions to the volume. Thus, the expansion process is very straight forward.

Now lets take the LVM as described and further enhance it by the inventions described in the related patents. Since we are interested in solving the general case as opposed to the specific case laid out thus far, we will further assume that LVM Features and Aggregators can be plug-in modules, and that any number of Features or Aggregators can be used to form a volume, and the Features and Aggregators associated with one volume are completely independent from those associated with another volume. The only constraint we will assume is that Features may only be applied to partitions or to the topmost aggregate in a volume. Thus, the LVM (as modified for the purposes of this example) now allows multiple levels of aggregation, and multiple features may be applied both to the partitions themselves or to the topmost aggregate that results from any aggregations carried out. Since every volume can have a different set of features and aggregators applied to it, the process to expand a volume is no longer as clear cut as it was previously.

With the new enhanced LVM as described above, we now have a very dynamic situation. Every volume can employ a different set of features and aggregators, and volumes employing the same features and aggregators do not have to apply them in the same order. Now, the LVM needs a way to determine if a volume can be expanded at all, and, if so, which aggregator will perform the expansion. The LVM also needs a way to determine which features or aggregators need to be applied to the partitions/aggregates being added to the volume, and it may even need to get user input to correctly configure the features/aggregators being applied to the partitions being added to the volume. Thus, a simple, fixed expansion method is no longer possible, but rather an adaptive method is needed.

Therefore, there exists a need in the art for an adaptive method which allows an enhanced logical volume manager (as previously described) to expand a logical volume. This method must allow the enhanced logical volume manager to determine if a logical volume is able to be expanded, what features and aggregators must be applied, in what order, to the partitions being added to the volume, and the process by which the partitions being added to the volume will be combined with the existing partitions of the volume to complete the expansion of the volume.

BRIEF DESCRIPTION OF THE DRAWINGS

The following detailed description and the figures presented herein present a complete description of the present invention.

SUMMARY OF THE INVENTION

Figure 1:
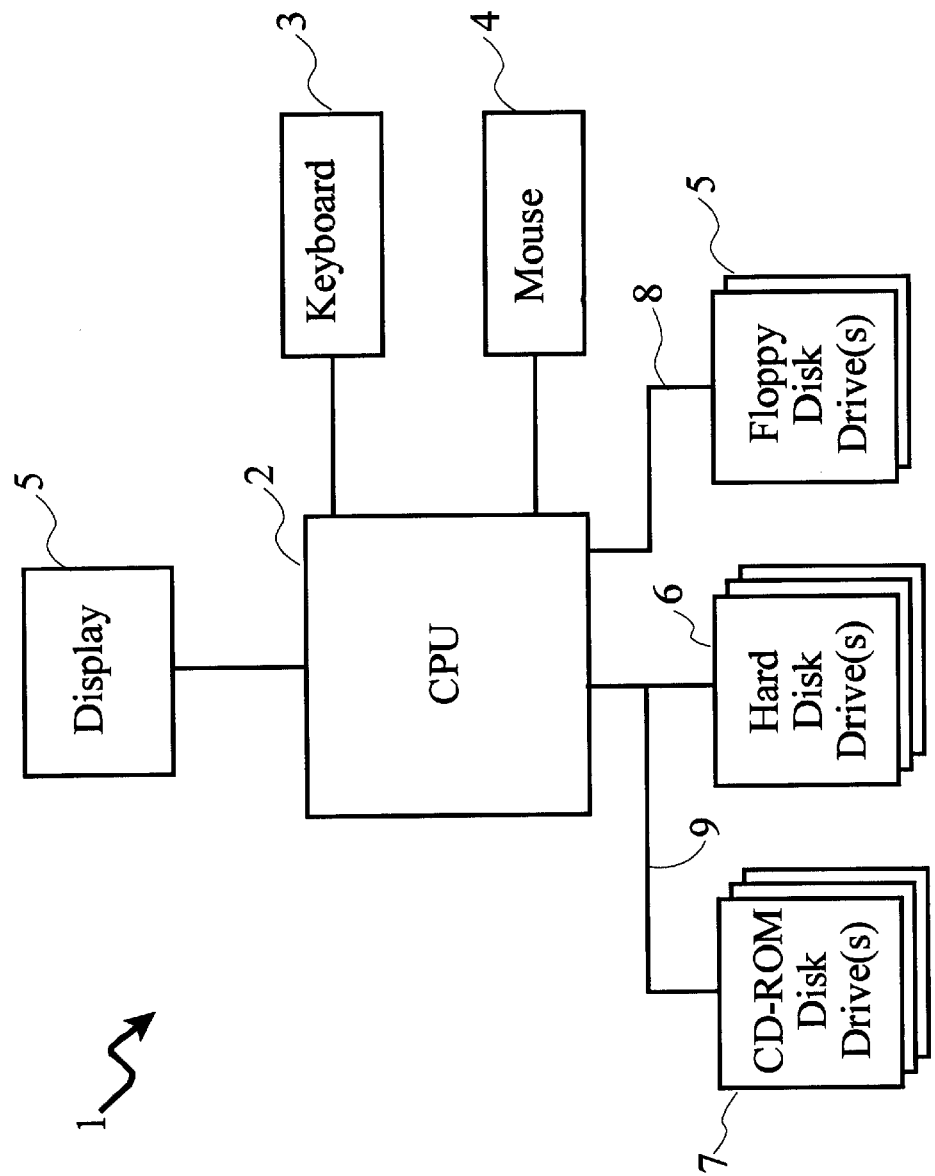
FIG. 1 discloses the fundamental hardware architecture of a computer such as a personal computer.
Figure 2:
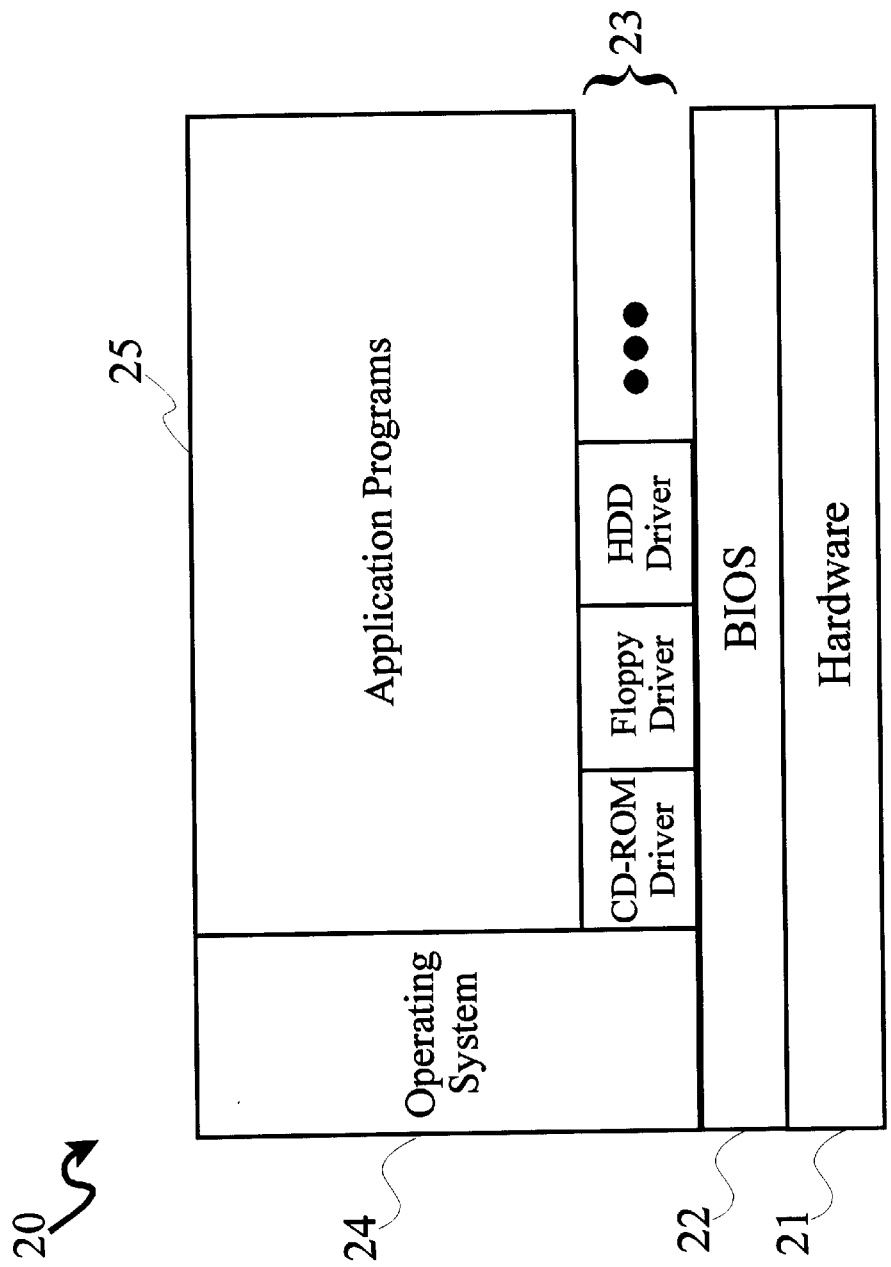
FIG. 2 discloses the fundamental software architecture of such a computer.
Figure 3:
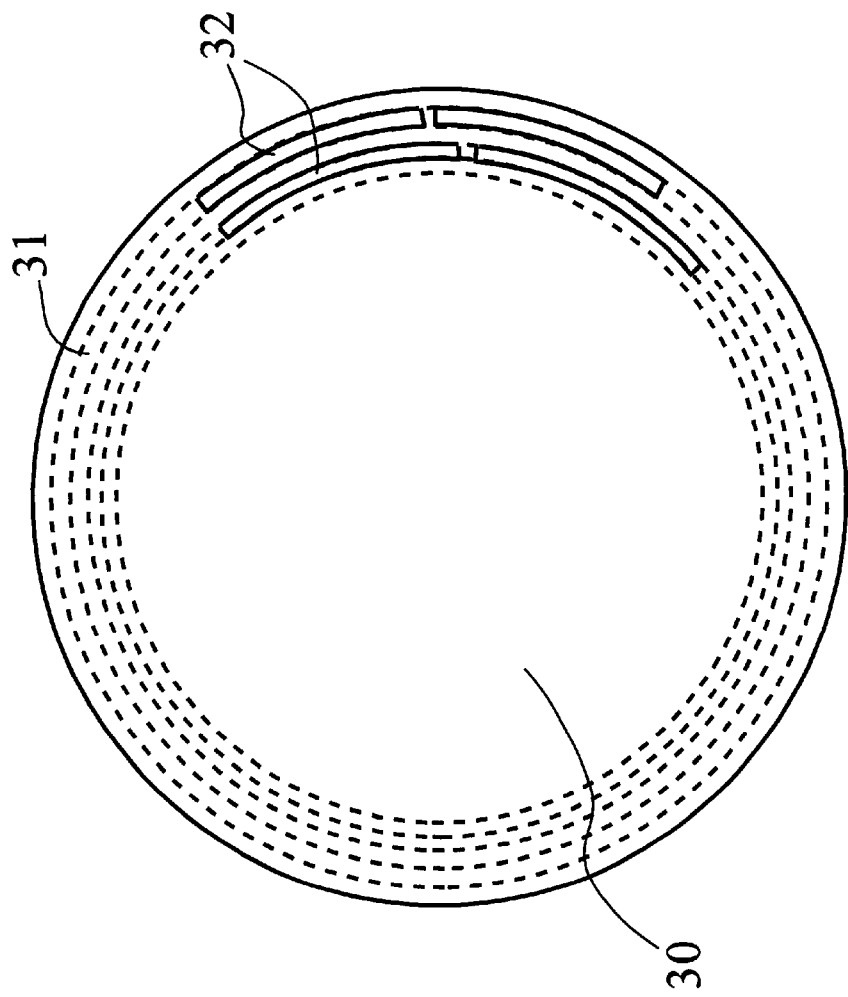
FIG. 3 illustrates the nature of formatting computer disk surfaces into tracks.
Figure 4:
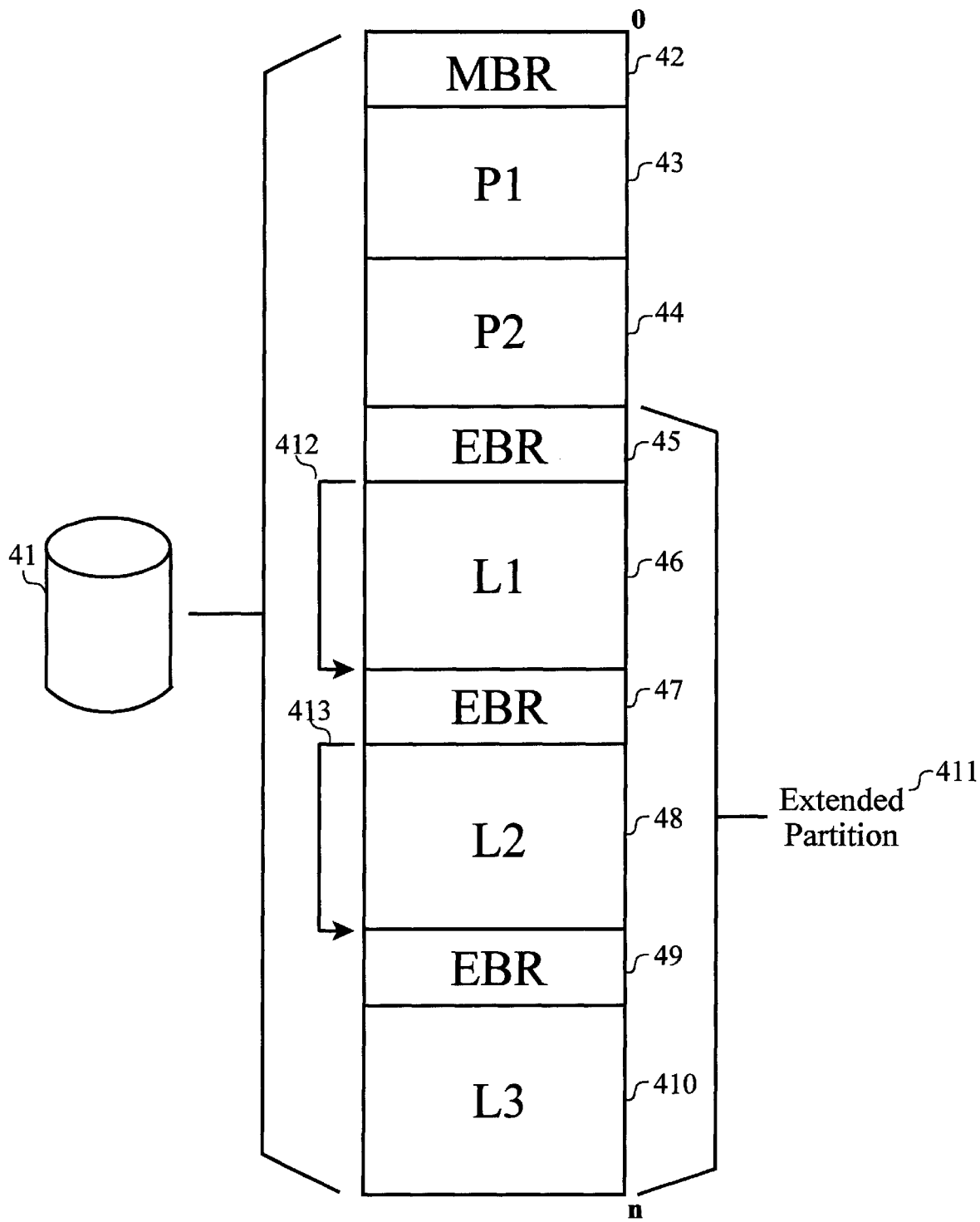
FIG. 4 shows the organization of the disk sectors into boot records and partitions.
Figure 5:
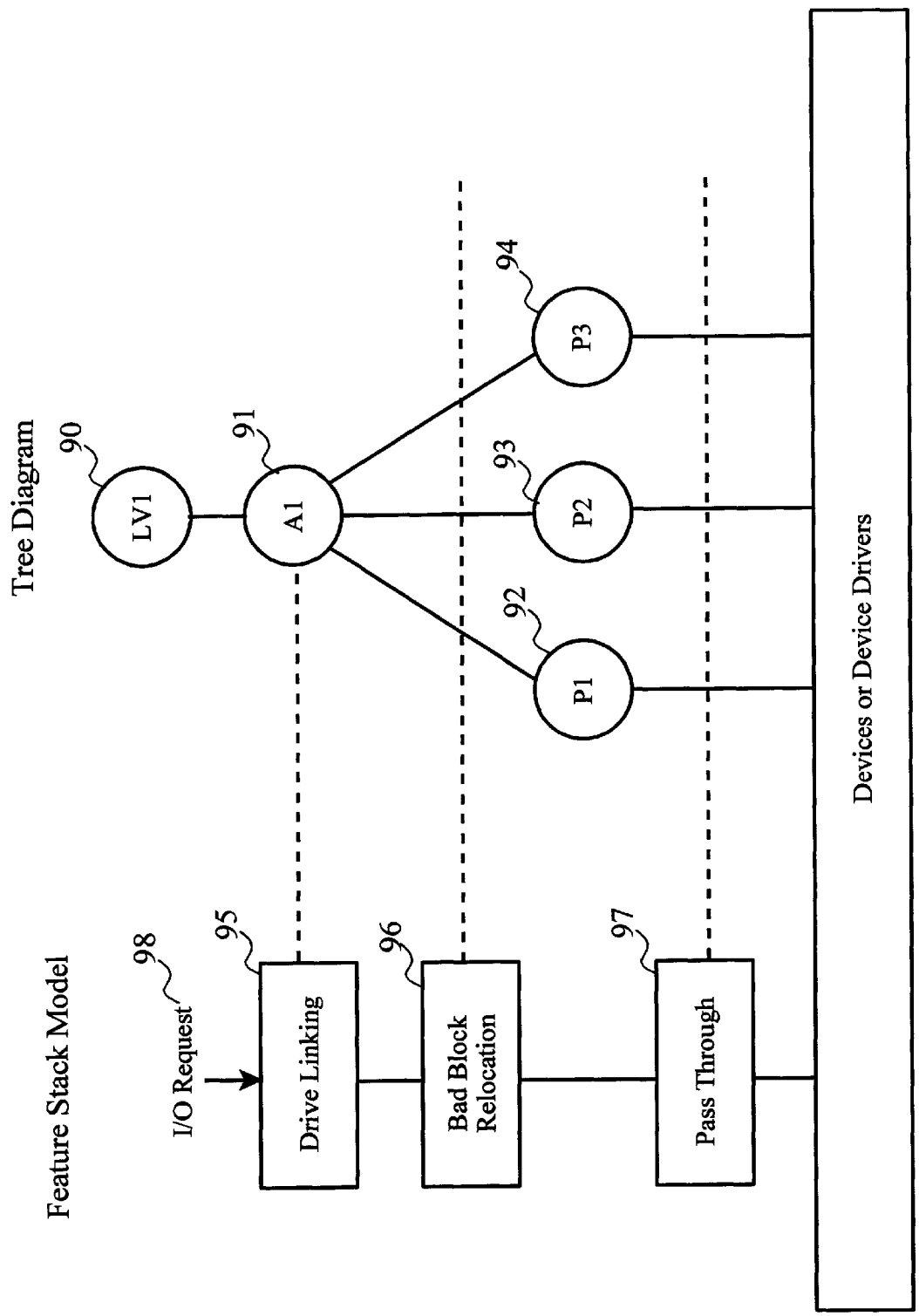
FIG. 5 depicts the well-known relationship between a feature stack model of a logical volume and a tree model of the same logical volume.

The invention is realized as an enhancement to existing logical volume managers such as the LVM supplied with the OS/2 Warp Server for e-business. It includes functionality to determine if a logical volume employing multiple levels of aggregation can be expanded. If it can be expanded, the aggregator which will perform the expansion is determined.

Once this has been done, the features and aggregators that need to be applied to the partitions being added to the volume are determined. These features and aggregators are then applied to the partitions being added to the volume, with user input as required. Finally, the aggregator which will perform the actual expansion is called, the volume is expanded, and all of the remaining features and aggregators on the volume are given the opportunity to update their respective data as appropriate to accommodate the new size of the volume.

DETAILED DESCRIPTION OF THE INVENTION

The invention is preferably realized using a well-known computing platform, such as an IBM personal computer, running the IBM OS/2 operating system. However, it may be realized in other popular computer system platforms, such as a Sun Microsystems or IBM RS/6000 workstation, running alternate operating systems such as Microsoft Windows, HP-UX, UNIX or LINUX, without departing from the spirit and scope of the invention.

By using OS/2 as the operating system of the preferred embodiment, the existing OS/2 Logical Volume Manager ("LVM") which was previously described in the "Background of the Invention" and in the related applications can be modified to realize the invention.

The existing OS/2 LVM provides a single-layer of aggregation, called the drive linking layer, and a system for creating and managing logical volumes. It employs a layered model, where each feature or function available for use on a volume is a separate module whose inputs and outputs are the same in form and structure. The features applied to a logical volume form a stack, with the aggregator (drive linking) being the topmost layer in the stack, and the special pass through layer being the bottom layer of the stack. When a volume is being created (or re-created after a system boot), the feature stack is built from the bottom up, beginning with the pass through layer. Once all of the volumes have been created and are ready for use, the LVM must begin to process I/O requests against the volumes in the system. When an I/O request is processed, it is processed from the top of the stack, down through the layers (the output of one layer is the input to the next), to the bottom of the feature stack where it is then sent on to the device(s).

The existing OS/2 LVM is further modified according to the related applications to realize an LVM with multiple-levels of aggregation. As the method for expanding a logical volume disclosed herein may be applied to most logical volume managers and not only to the OS/2 LVM, the following disclosure is made in terms of modifications to the OS/2 LVM as a preferred embodiment and an example only. Thus, it will be recognized by those skilled in the art that certain changes may be made to other LVM's to realize the invention. So, for the purpose of disclosing the preferred embodiment, we will assume that the OS/2 LVM is modified such that Features and Aggregators can be plug-in modules, that any number of Features or Aggregators can be used to form a logical volume, and that the Features and Aggregators associated with one logical volume are completely independent from those associated with another logical volume. The only constraint we will assume is that Features may only be applied to partitions or to the topmost aggregate in a volume. Thus, the modified OS/2 LVM now allows multiple levels of aggregation, and multiple features may be applied both to the partitions themselves or to the topmost aggregate that results from any aggregations carried out.

Figure 6:
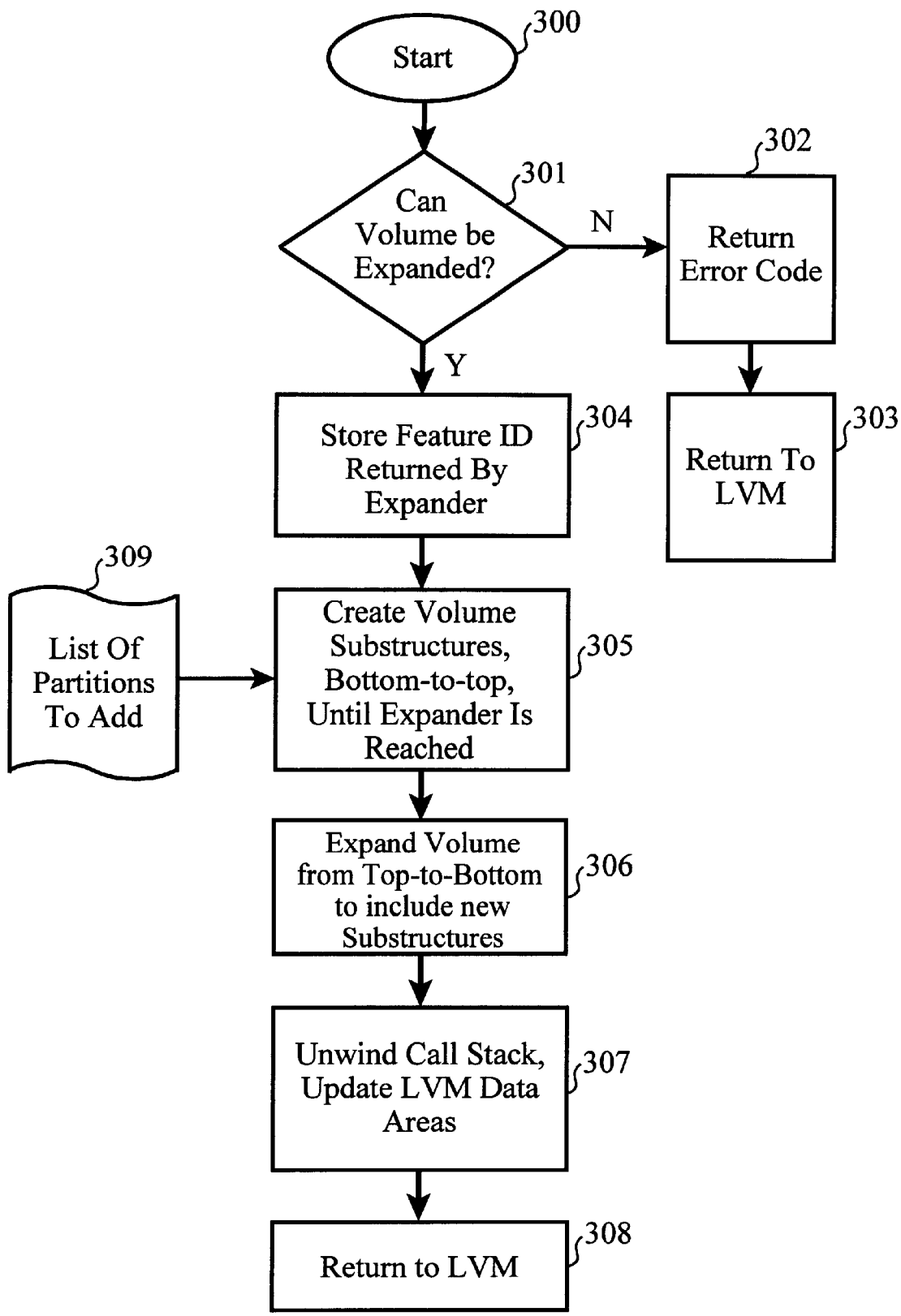
FIG. 6 illustrates the main logical flow of the method to expand a logical volume in the presence of multiple plugin features.

According to the preferred embodiment, the present invention is implemented partly in the LVM itself, and partly in the feature/aggregator plugins. In the LVM architecture, the aggregators and features on a volume are chained to each other, forming a stack, with each feature/aggregator having access to the entry points of the feature/aggregator below it. In the preferred embodiment, the LVM implements a special feature, called the Pass Through layer, which is always the bottom-most feature in the feature stack. Furthermore, each feature/aggregator in the LVM, whether it is a plug-in or not, has a unique, non-zero feature ID. Finally, all features/aggregators support the same set of entry points. Given this environment, the invention works as follows and as illustrated in FIG. 6.

(a) All features/aggregators are required to support a new entry point called CAN_EXPAND. CAN_EXPAND is implemented as follows: If the feature is an aggregator which can actually expand its associated aggregate, then the feature returns its feature ID to the caller. If the feature is not an aggregator but can tolerate having the partition or aggregate it is applied to change size, it will call the CAN_EXPAND entry point of the feature/aggregator below it in the feature stack, and it will pass back the return value which is returned by that next lower feature. If the current feature/aggregator can not tolerate having its associated partition/aggregate change size, it returns a feature ID of 0. The Pass Through feature will always return 0 for this entry point. Using this method, each feature and aggregator in the feature stack that may be affected by the expansion can "veto" the expansion by passing back a return value of 0. But, if all of the affected features and aggregators allow the expansion, the aggregator which will perform the expansion passes back its ID value.

(b) When a volume is to be expanded, LVM calls (301) the CAN_EXPAND entry point in the topmost feature on the volume. If LVM receives a 0 for the returned feature ID (302), it then knows that the volume cannot be expanded and it returns an error code indicating such to the user interface which called it. If the feature ID returned is non-zero (304), then LVM knows which aggregator will be performing the expansion.

(c) Now that LVM knows the volume can be expanded, it takes the list (309) of partitions (provided by the user) that are to be added to the volume and begins passing (305) the list of partitions to the features/aggregators in the feature stack of the volume proceeding from the bottom of the feature stack towards the top of the feature stack. It will stop when it encounters the aggregator whose feature ID was returned by the CAN_EXPAND call done earlier. When LVM passes the list of partitions to each of the features, it will use the same entry point as it does when creating a new volume. This allows each of the features to invoke any user interface routines that may be required to gather configuration information. For example, if software RAID was one of the features, it would invoke a configuration routine that would allow the user to combine the partitions being added to the volume into a single, RAID 5 aggregate, according to the user's preferences and settings. This is useful if the volume currently consists of one or more RAID 5 aggregates linked together by Drive Linking.

(d) Now that all of the features below the aggregator performing the expansion have been applied to the partitions being added to the volume, LVM applies the remaining features. This is accomplished by having LVM call the ADD_PARTITIONS (306) entry point on the topmost feature on the feature stack and passing the list of partitions. If the top-most feature is not going to perform the expansion, it will call the ADD_PARTITONS entry point of the next feature down in the stack, passing along the list of partitions. Eventually, the aggregator performing the expansion is reached, and the partitions are added to its associated aggregate. After adding the partitions to its aggregate, the aggregator destroys the old LVM data area associated with the aggregate and creates a new one in the expected location at the end of the expanded aggregate. Then, as the call stack unwinds (307), each feature above the aggregator will adjust its LVM data and write it to the new LVM data area. When the last feature has completed this, control is returned to LVM (308), which then reports the new size of the volume to the user interface.

Methods and systems to provide logical volume expansion for a multi-layer logical volume manager have been described and set forth in both general terms applicable to concepts and methodoligies useful for LVM's of many operating systems, and in particular terms applicable to IBM's OS/2 Warp Server for E-business operating system.

It will be understood by those skilled in the relevant arts and from the foregoing description that various modifications and changes may be made in the preferred embodiment of the present invention without departing from its true spirit and scope, such as the use of alternate computer platforms, operating systems and disk storage means. It is intended that this description is for purposes of illustration only and should not be construed in a limiting sense. The scope of this invention should be limited only by the language of the following claims.

What is claimed is:

1. A method for expanding logical volumes of computer-readable media for a computer system, said logical volumes employing multiple levels of aggregation and containing a plurality of computer-readable media partitions, said computer system having a logical volume manager for creating and managing logical volumes, said logical volume manager incorporating features and aggregators as plug-in modules such that multiple features or aggregators can be applied to a logical volume, said features and aggregators applied to a logical volume forming a feature stack, said feature stack having a top-most feature or aggregator and a bottom-most feature or aggregator, and each feature and aggregator having a unique identifier value and a partition addition function, each aggregator having a logical volume manager data area, said method comprising the steps of:

(a) providing an expansion ability query function within each said feature and aggregator such that when executed or called, if the feature is an expander aggregator which can expand its associated aggregate, then the feature returns its unique identifier value, else if the feature is not an expander aggregator but can tolerate an expansion of the logical volume, then the feature executes or calls an expansion ability query function of any feature or aggregator below it in the feature stack and returns value which is returned by that lower feature, else if the feature can neither expand its associated aggregate or tolerate expansion of the logical volume, each expansion ability query function will return a failure value;

(b) responsive to receiving a unique identifier value from an expansion ability query function, applying to computer-readable media partitions of the logical volume the features below the expander aggregator by passing a list of partitions that are to be added to the logical volume to each of the features and aggregators within the feature stack of the logical volume in an order proceeding from the bottom-most feature towards the top-most feature until the expander aggregator is reached, such that each of the features in the feature stack may invoke any user interface routines that may be required to gather configuration information from a user;

(c) applying the remaining features of the feature stack by executing or calling the partition addition function of the top-most feature using the list of partitions to be added, such that if the top-most feature is not the expander feature, the partition addition function of the next feature down in the feature stack is executed or called using list the of partitions to be added, so that the expander aggregator's partition addition function is eventually executed or called and the listed partitions are added to its associated aggregate; and (d) updating the logical volume data areas associated with the expander aggregator and all features above the expander aggregator within the feature stack such that when the top-most feature has completed updating its logical volume data area, said expansion of the logical volume is complete.

2. The method for expanding logical volumes of computer-readable media for a computer system as set forth in claim 1 wherein said expansion ability query function is provided as an entry point to each feature and aggregator within the feature stack.

3. The method for expanding logical volumes of computer-readable media for a computer system as set forth in claim 1 wherein said failure value is zero.

4. A computer-readable storage medium having stored therein computer-readable program code for expanding logical volumes of computer-readable media for a computer system, said computer system having a processor capable of executing computer-readable program code, said logical volumes employing multiple levels of aggregation and containing a plurality of computer-readable media partitions, said computer system having a logical volume manager for creating and managing logical volumes, said logical volume manager incorporating features and aggregators as plug-in modules such that multiple features or aggregators can be applied to a logical volume, said features and aggregators applied to a logical volume forming a feature stack, said feature stack having a top-most feature or aggregator and a bottom-most feature or aggregator, and each feature and aggregator having a unique identifier value and a partition wherein the program code when executed by the processor causes the processor to perform the steps of:

(a) providing an expansion ability query function within each said feature and aggregator such that when executed or called, if the feature is an expander aggregator which can expand its associated aggregate, then the feature returns its unique identifier value, else if the feature is not an expander aggregator but can tolerate an expansion of the logical volume, then the feature executes or calls an expansion ability query function of any feature or aggregator below it in the feature stack and returns value which is returned by that lower feature, else if the feature can neither expand its associated aggregate or tolerate expansion of the logical volume, each expansion ability query function will return a failure value;

(b) responsive to receiving a unique identifier value from an expansion ability query function, applying to computer-readable media partitions of the logical volume the features below the expander aggregator by passing a list of partitions that are to be added to the logical volume to each of the features and aggregators within the feature stack of the logical volume in an order proceeding from the bottom-most feature towards the top-most feature until the expander aggregator is reached, such that each of the features in the feature stack may invoke any user interface routines that may be required to gather configuration information from a user;

(c) applying the remaining features of the feature stack by executing or calling the partition addition function of the top-most feature using the list of partitions to be added, such that if the top-most feature is not the expander feature, the partition addition function of the next feature down in the feature stack is executed or called using list the of partitions to be added, so that the expander aggregator's partition addition function is eventually executed or called and the listed partitions are added to its associated aggregate; and (d) updating the logical volume data areas associated with the expander aggregator and all features above the expander aggregator within the feature stack such that when the top-most feature has completed updating its logical volume data area, said expansion of the logical volume is complete.

5. The computer-readable storage medium having stored therein computer-readable program code for expanding logical volumes of computer-readable media for a computer system as set forth in claim 4 further comprising an IBM OS/2 Logical Volume Manager program code stored in said computer-readable storage medium.

6. The computer-readable storage medium having stored therein computer-readable program code for expanding logical volumes of computer-readable media for a computer system as set forth in claim 4 wherein said step of providing an expansion ability query function within each said feature and aggregator further comprises providing an entry point within each feature or aggregator within the feature stack.

7. A system for expanding logical volumes of computer-readable media for a computer, said logical volumes employing multiple levels of aggregation and containing a plurality of computer-readable media partitions, said computer having a processor capable of executing software, said computer further having a logical volume manager for creating and managing logical volumes, said logical volume manager incorporating features and aggregators as plug-in modules such that multiple features or aggregators can be applied to a logical volume, said features and aggregators applied to a logical volume forming a feature stack, said feature stack having a top-most feature or aggregator and a bottom-most feature or aggregator, and each feature and aggregator having a unique identifier value and a partition addition function, each aggregator having a logical volume manager data area, said system comprising:

an expansion ability query and expander aggregator identification function associated with each said feature and aggregator such that when executed or called, if the associated feature is an expander aggregator which can expand its associated aggregate, then the associated feature returns its unique identifier value, else if the associated feature is not an expander aggregator but can tolerate an expansion of the logical volume, then the associated feature executes or calls an expansion ability query function of any feature or aggregator below it in the feature stack and returns value which is returned by that lower feature, else if the associated feature can neither expand its associated aggregate or tolerate expansion of the logical volume, each expansion ability query function will return a failure value;

a first feature applicator responsive to receipt of a unique identifier value from an expansion ability query function, said first feature applicator being adapted to apply to computer-readable media partitions of the logical volume the features below an expander aggregator by passing a list of partitions that are to be added to the logical volume to each of the features and aggregators within the feature stack of the logical volume in an order proceeding from the bottom-most feature towards the top-most feature until the expander aggregator is reached, such that each of the features in the feature stack may invoke any user interface routines that may be required to gather configuration information from a user;

a second feature applicator responsive to complete operation of said first feature applicator, said second feature applicator being adapted to apply the remaining features of the feature stack by executing or calling the partition addition function of the top-most feature using the list of partitions to be added, such that if the top-most feature is not the expander feature, the partition addition function of the next feature down in the feature stack is executed or called using list the of partitions to be added, so that the expander aggregator's partition addition function is eventually executed or called and the listed partitions are added to its associated aggregate; and at least one logical volume manager data area updater associated with the expander aggregator and all the features above the expander aggregator within the feature stack, said logical volume manager data area updater being adapted to update logical volume manager data areas to reflect the completion of the logical volume expansion.

8. The system for expanding logical volumes of computer-readable media for a computer as set forth in claim 7 wherein said logical volume manager is an IBM OS/2 logical volume manager, and wherein said expansion ability query and expander aggregator identification function, said first feature applicator, said second feature applicator, and said logical volume manager data area updater are compatible with an IBM OS/2 operating system.

9. The system for expanding logical volumes of computer-readable media for a computer as set forth in claim 7 wherein said logical volume manager is a Unix logical volume manager, and wherein said expansion ability query and expander aggregator identification function, said first feature applicator, said second feature applicator, and said logical volume manager data area updater are compatible with a Unix operating system.

10. The system for expanding logical volumes of computer-readable media for a computer as set forth in claim 7 wherein said logical volume manager is a Microsoft Windows logical volume manager, and wherein said expansion ability query and expander aggregator identification function, said first feature applicator, said second feature applicator, and said logical volume manager data area updater are compatible with a Microsoft Windows operating system.

11. The system for expanding logical volumes of computer-readable media for a computer as set forth in claim 7 wherein said logical volume manager is a Linux logical volume manager, and wherein said expansion ability query and expander aggregator identification function, said first feature applicator, said second feature applicator, and said logical volume manager data area updater are compatible with a Linux operating system.

* * * * *